(12) United States Patent
Layne (10) Patent No.: US 9,903,280 B2
(45) Date of Patent: Feb. 27, 2018

(54) CONTROL VALVE WITH ANNULAR POPPET CHECK VALVE

(71) Applicant: HUSCO Automotive Holdings LLC, Waukesha, WI (US)

(72) Inventor: Michael Layne, Waterford, WI (US)

(73) Assignee: HUSCO Automotive Holdings LLC, Waukesha, WI (US)

( * ) Notice: Subject to any disclaimer, the term of this patent is extended or adjusted under 35 U.S.C. 154(b) by 189 days.

(21) Appl. No.: 15/040,414

(22) Filed: Feb. 10, 2016

(65) Prior Publication Data

US 2016/0230678 A1    Aug. 11, 2016

Related U.S. Application Data

(60) Provisional application No. 62/114,842, filed on Feb. 11, 2015.

(51) Int. Cl.
| | |
|---|---|
| *F16K 11/06* | (2006.01) |
| *F02D 13/02* | (2006.01) |
| *F16K 15/08* | (2006.01) |
| *F16K 15/02* | (2006.01) |
| *F01L 13/00* | (2006.01) |
| *F16K 31/06* | (2006.01) |
| *F16K 11/044* | (2006.01) |

(52) U.S. Cl.
CPC ...... *F02D 13/0203* (2013.01); *F01L 13/0005* (2013.01); *F16K 11/044* (2013.01); *F16K 15/026* (2013.01); *F16K 15/08* (2013.01); *F16K 31/0627* (2013.01); *F16K 31/0693* (2013.01); *F01L 2013/106* (2013.01)

(58) Field of Classification Search
CPC .... F02D 13/0203; F16K 15/026; F16K 15/08; F16K 31/0627; F16K 11/044; F16K 31/0693; F01L 1/34; F01L 13/0005; F15B 13/044
See application file for complete search history.

(56) References Cited

U.S. PATENT DOCUMENTS

| | | |
|---|---|---|
| 3,202,182 A | 8/1965 | Haviland |
| 4,880,033 A | 11/1989 | Neff |
| 5,271,371 A | 12/1993 | Meints et al. |
| 5,375,576 A | 12/1994 | Ausman et al. |

(Continued)

FOREIGN PATENT DOCUMENTS

| | | |
|---|---|---|
| EP | 0900962 A2 | 10/1999 |
| EP | 1538308 A1 | 8/2005 |

*Primary Examiner* — Jacob Amick
(74) *Attorney, Agent, or Firm* — Quarles & Brady LLP (57) ABSTRACT

Embodiments of the invention provide a control valve including a control valve body having an inlet passage, an outlet passage, a workport, and a chamber arranged in a fluid path between the workport and the outlet passage. The control valve further includes an annular poppet slidably received within the chamber and to selectively engage a poppet seat to inhibit fluid flow through the fluid path when a pressure in the fluid path is less than a predefined pressure level, and a valve element slidably received within the control valve body to selectively provide fluid communication between the inlet passage and the workport and selectively provide fluid communication between the workport and the outlet passage along the fluid path. The poppet is biased towards the poppet seat by an elastic element.

25 Claims, 5 Drawing Sheets

(56) References Cited

U.S. PATENT DOCUMENTS

| | | | |
|---|---|---|---|
| 5,597,118 A | | 1/1997 | Carter, Jr. et al. |
| 5,682,858 A | | 11/1997 | Chen et al. |
| 5,709,342 A | | 1/1998 | McCauley |
| 6,688,266 B1 | | 2/2004 | Church et al. |
| 6,701,959 B1 | | 3/2004 | Flynn et al. |
| 6,901,959 B2 | | 6/2005 | Burrola et al. |
| 7,111,597 B2 | | 9/2006 | Manole et al. |
| 7,159,551 B2 | | 1/2007 | Cecur et al. |
| 7,263,956 B2 | | 9/2007 | Spath et al. |
| 7,757,648 B2 | | 7/2010 | Hendriksma et al. |
| 7,921,880 B2 | | 4/2011 | Jackson et al. |
| 8,316,888 B2 | | 11/2012 | Beneker et al. |
| 8,443,839 B2 | * | 5/2013 | Beneker ............... F01L 1/34 123/90.11 |
| 2006/0249210 A1 | | 11/2006 | Van Weelden |
| 2008/0223460 A1 | | 9/2008 | Pecheny |
| 2010/0019186 A1 | | 1/2010 | Keller et al. |
| 2012/0168007 A1 | | 7/2012 | Wonders |
| 2013/0075639 A1 | | 3/2013 | Beneker et al. |
| 2015/0330528 A1 | * | 11/2015 | Bamber ............... F16K 31/12 137/624.27 |
| 2016/0123484 A1 | * | 5/2016 | Mori ............... F16K 15/08 137/512 |

\* cited by examiner

CONTROL VALVE WITH ANNULAR POPPET CHECK VALVE

CROSS REFERENCE TO RELATED APPLICATIONS

The present application is based on, claims priority to, and incorporates herein by reference in its entirety, U.S. Provisional Patent Application No. 62/114,842, filed Feb. 11, 2015, and entitled "Control Valve with Annular Poppet Check Valve."

STATEMENT REGARDING FEDERALLY SPONSORED RESEARCH OR DEVELOPMENT

Not applicable.

BACKGROUND OF THE DISCLOSURE

The present invention relates generally to control valves and, more specifically, to a control valve that includes an annular poppet check valve.

In automotive engines, an increasing number of control functions are being actuated using engine oil pump pressure. For cylinder deactivation systems, it is necessary to ensure that moving components, such as cylinder valve lifters, are exposed to positive oil pressure for lubrication. Pressure between the cylinder valve lifters and the oil control valve used to deactivate the lifters also helps to reduce hydraulic compliance that could limit the pressure response of the engine cylinder deactivation system.

Figure 1:
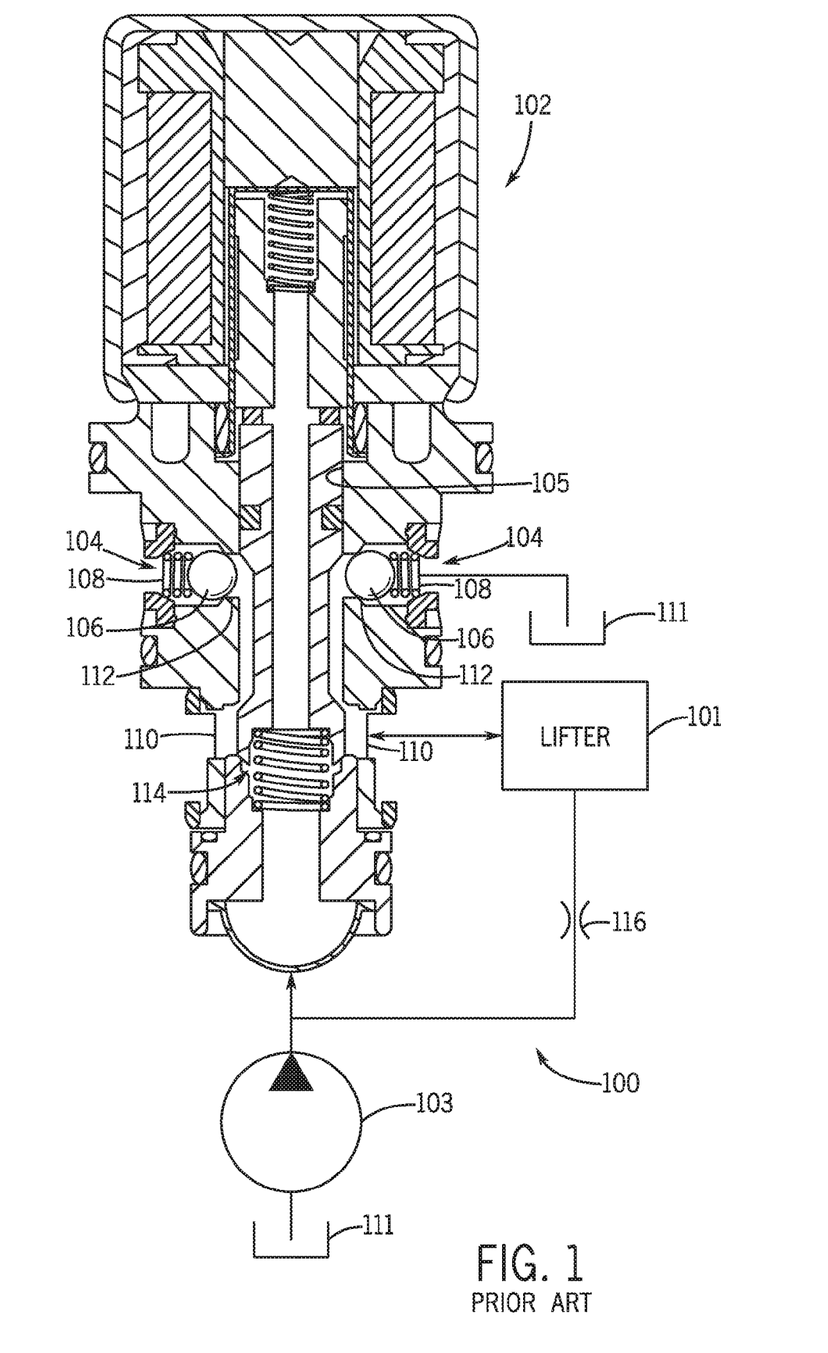
FIG. 1 shows a prior control valve system including ball type check valves.

Referring now to FIG. 1, in some control valves used in engine cylinder deactivation systems, such as cylinder deactivation system 100, an oil pump 103 can supply pressurized fluid to a control valve 102 that can be connected to a cylinder valve lifter 101. The oil pressure between the cylinder valve lifter 101 and the oil control valve 102 can be maintained by using low pressure check valves 104 built into the oil control valve 102. These low pressure check valves 104 can include balls 106 held against ball seats 112 by springs 108. The balls 106 can block the flow of the oil from the lifter passages 110 to an oil tank 111 until the oil pressure in the lifter passages 110 creates a force on the ball seats 112 greater than or equal to the force of the spring load. Once the oil pressure in the lifter passage 110 creates enough force, the check valve ball 106 can lift off of the ball seat 112, and the oil can flow past the balls 106 as long as the pressure force exceeds the spring force. The oil flow into the lifter passage 110 can either be supplied by orifice 114 in the oil control valve 102 or an orifice 116 positioned remotely from the control valve 102 between the cylinder valve lifter 101 and the pump 103.

There are some disadvantages to the ball style pressure check valves for application in an engine. In this typical arrangement, the passages, including the check valve seat area, are oriented radially outward from the valve bore 105. Sufficient space for the flow passage, seat area, ball, and spring is required. Having this space requirement means that the diameter of the valve body, and thus the cavity in the engine, have to be large enough to accommodate these parts. Also, the flow passage into the check valve and the ball seat area are necessarily the same size, so the only way to increase the flow area in this design is to also increase the ball size or use multiple check valves in parallel. Bigger balls and multiple check valves increase the size of the overall valve package and the number of components. Further, the check valve springs often are difficult to produce and assemble due to the low force and spring rate design criteria required to maintain the typical low hydraulic pressure.

Thus, it would be advantageous to have a control valve including a check valve that allows for more control over the flow rate of a fluid without having to adjust the size of the check valve.

BRIEF SUMMARY OF THE DISCLOSURE

The aforementioned shortcomings can be overcome by providing a control valve that includes a check valve having an annular poppet that provides a large flow area and thereby reduces a pressure drop through the check valve.

In one aspect, the present invention provides a control valve including a control valve body having an inlet passage, an outlet passage, a workport, and a chamber arranged in a fluid path between the workport and the outlet passage. The control valve further includes an annular poppet slidably received within the chamber and to selectively engage a poppet seat to inhibit fluid flow through the fluid path when a pressure in the fluid path is less than a predefined pressure level, and a valve element slidably received within the control valve body to selectively provide fluid communication between the inlet passage and the workport and selectively provide fluid communication between the workport and the outlet passage along the fluid path. The control valve further includes elastic element to bias the annular poppet towards the poppet seat.

In some embodiments, the control valve body includes an outer body extending around an inner body with the chamber formed therebetween.

In some embodiments, the annular poppet extends around the inner body.

In some embodiments, the annular poppet defines a poppet approach area on which the pressure in the fluid path acts upon, and the outer body defines an outer body diameter.

In some embodiments, a force provided by the elastic element on the annular poppet and the approach area determine the predefined pressure level.

In some embodiments, the outer body defines an outer body diameter and a ratio of the approach area to the outer body diameter is between about 1.5 and 3.5.

In some embodiments, the outer body defines an outer body diameter and a ratio of the approach area to the outer body diameter is between about 2 and 3.

In some embodiments, the control valve body includes a first valve seat between the inlet passage and the workport and a second valve seat between the workport and the outlet passage, and the valve element is moveable between a first element position where the valve element engages the first valve seat and a second element position where the valve element engages the second valve seat.

In some embodiments, the control valve further includes at least one spring to bias the valve element toward one of the first element position and the second element position.

In some embodiments, the control valve further includes an actuator to actuate the valve element between the first element position and the second element position.

In some embodiments, the elastic element is a coil spring.

In some embodiments, the control valve is installed on an engine to operate a cylinder valve lifter assembly.

In some embodiments, the inlet passage is connected to receive fluid from an oil pump on the engine and the outlet passage is connected to an oil reservoir on the engine.

In some embodiments, the workport is connected to an engine cylinder lifter assembly.

In another aspect, the present invention provides a control valve including a control valve body having an inlet passage, an outlet passage, a workport, a first valve seat between the inlet passage and the workport, and a second valve seat in a fluid path between the workport and the outlet passage. The control valve further includes a valve element moveable between a first element position where the valve element engages the first valve seat and disengages the second valve seat, and a second element position where the valve element disengages the first valve seat and engages the second valve seat. The control valve further includes an annular poppet moveable between a first position where the annular poppet engages an annular poppet seat to inhibit fluid flow through the fluid path and a second poppet position where the annular poppet disengages the annular poppet seat and fluid flow is provided through the fluid path. The annular poppet is moveable from the first poppet position towards the second poppet position when pressure in the fluid path is greater than a predefined pressure level. The control valve further includes a spring to bias the annular poppet toward the first poppet position.

In some embodiments, the control valve body includes an annular chamber in the fluid path between the second valve seat and the outlet passage and the annular poppet is slidably received within the annular chamber.

In some embodiments, the control valve body includes an outer body into which an inner body is received, and the annular chamber and the annular poppet each extend around the inner body.

In some embodiments, the inner body defines a bore in which the valve element is slidably received.

In some embodiments, the annular poppet defines a poppet approach area on which the pressure in the fluid path acts upon.

In some embodiments, a force provided by the elastic element on the annular poppet and the approach area determine the predefined pressure level.

In some embodiments, the outer body defines an outer body diameter and a ratio of the approach area to the outer body diameter is between about 1.5 and 3.5.

In some embodiments, the outer body defines an outer body diameter and a ratio of the approach area to the outer body diameter is between about 2 and 3.

In some embodiments, the control valve further includes a valve spring to bias the valve element towards one of the first element position and the second element position.

In some embodiments, the control valve further includes an actuator to move the valve element between the first element position and the second element position.

These and other objects, advantages, and aspects of the inventions will become apparent from the following description. In the description, reference is made to the accompanying drawings which form a part hereof and in which there is shown a preferred embodiment of the invention. Such embodiment does not necessarily represent the full scope of the invention and reference is made, therefore, to the claims herein for interpreting the scope of the invention.

DETAILED DESCRIPTION OF THE DISCLOSURE

One or more specific embodiments of the present invention will be described below. It should be appreciated that in the development of any such actual implementation, as in any engineering or design project, numerous implementation specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The various aspects of the subject disclosure are now described with reference the drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

The word "exemplary" is used herein to mean serving as an example, instance, or illustration. Any aspect or design described herein as "exemplary" is not necessarily to be construed as preferred or advantageous over other aspects or designs.

In addition, references herein to directional relationships and movement such as up and down or inner and outer, refer to the relationship and movement of the components in the orientation illustrated in the drawings, which may not be the orientation of the components in practice.

Figure 2:
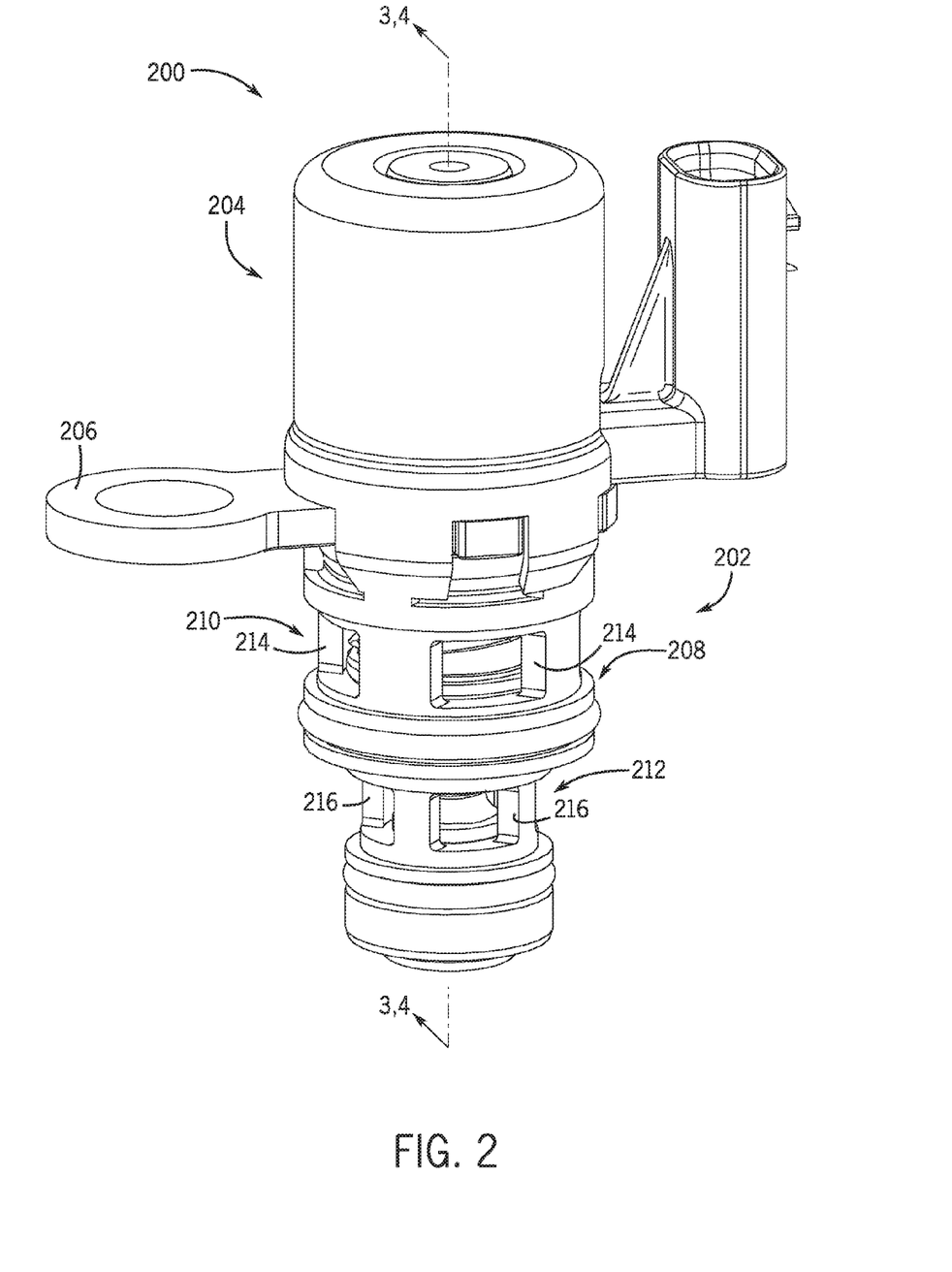
FIG. 2 shows a perspective view of a control valve including an annular poppet check valve according to one embodiment of the invention.

Referring now to the drawings and more specifically, referring to FIG. 2, the present disclosure will be described in the context of an exemplary control valve 200 for deactivating an engine cylinder. It is to be appreciated that the control valve 200 can be used in other applications where fluid control is required, as would be understood by one of skill in the art. The reference to cylinder deactivation is not to be considered limiting in any way. As shown in FIG. 2, the control valve 200 can include a control valve body 202 coupled to an actuator 204. A mounting flange 206 can be arranged between the control valve body 202 and the actuator 204. The mounting flange 206 can enable the control valve 200 to be coupled to, for example, an engine. The control valve body 202 can include an outer body 208 having a outlet passage 210 and a workport 212 spaced longitudinally from the outlet passage 210. The outlet passage 210 can be formed by a plurality of outlet cutouts 214 arranged circumferentially around a periphery of the outer body 208. The workport 212 can be formed by a plurality of workport cutouts 216 arranged circumferentially around a periphery of the outer body 208.

Figure 3:
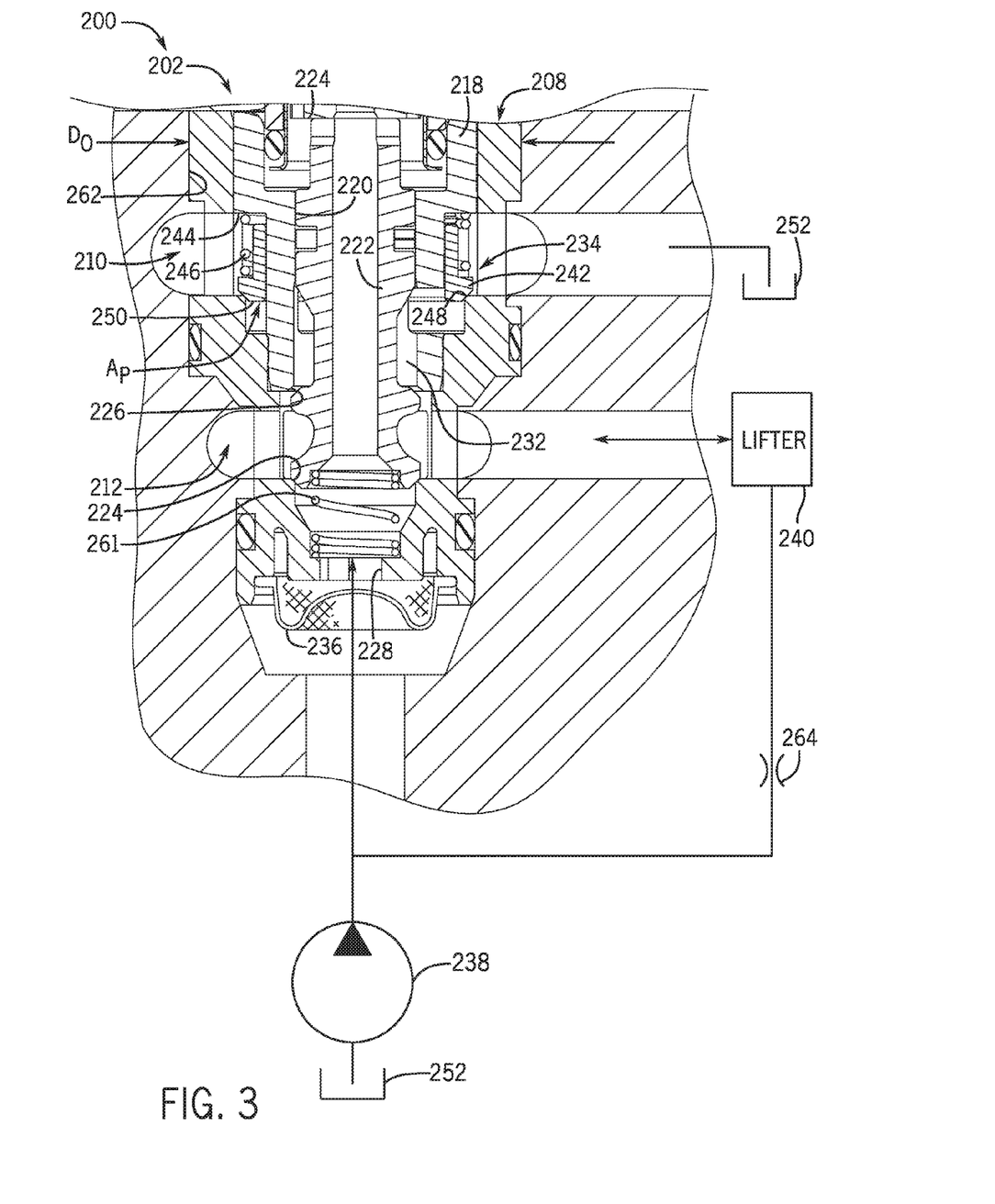
FIG. 3 shows a partial cross-sectional view of the control valve of FIG. 2 taken along line 3-3.

Turning to FIG. 3, the outer body 208 can define a outer body diameter $D_o$ that defines a size of a cavity in which the control valve body 202 can be mounted. The control valve body 202 can include an inner body 218 arranged within the outer body 208 and can define a bore 220 within which a valve element 222 is slidably received. The actuator 204, which may be in the form of a solenoid, can operate on an end 224 of the valve element 222 causing the valve element 222 to move with respect to the inner body 218 to engage and disengage a first valve seat 224 and a second valve seat 226. That is, the valve element 222 is moveable between a first element position (FIG. 3) where the valve element 222 engages the first valve seat 224 and disengages the second valve seat 226, and a second element position where the valve element 222 engages a second valve seat 226 and disengages the first valve seat 224. When the valve element 222 is in the first element position, as shown in FIG. 3, fluid communication can be inhibited between an inlet passage 228 of the control valve 200 and the workport 212 and fluid communication can be provided along a fluid path 232 between the workport 212 and a check valve 234. When the valve element 222 is in the second element position, fluid communication can be provided between the inlet passage 228 and the workport 212, and fluid communication can be inhibited along the fluid path 232 between the workport 212 and the check valve 234. The illustrated valve element 222 can be a poppet, however, in other embodiments, the valve element 222 may be a spool.

A mesh filter 236 can be coupled to the outer body 208 adjacent to the inlet passage 228 and can be arranged upstream of the inlet passage 228. In some installations, the control valve 200 can be implemented in a cylinder deactivation system where the inlet passage 228 receives pressurized fluid from an engine oil pump 238, and the workport 212 is coupled to an engine cylinder valve lifter assembly 240.

The check valve 234 can inhibit fluid to flow from the outlet passage 210 to the workport 212 and can comprise an annular poppet 242 arranged within a check valve chamber 244 between the inner body 218 and the outer body 208. In some embodiments, the annular poppet 242, the inner body 218, and the outer body 208 can be fabricated from plastic. In these embodiments, the annular poppet 242, the inner body 218, and the outer body 208 can be manufactured using a molding process. The annular poppet 242 can extend around the inner body 218 and may slide up and down with respect to the inner body 218. An elastic element 246 can be used to bias the annular poppet 242 toward an annular poppet seat 248 formed on the outer body 208. In some embodiments, the elastic element 246 is a coil spring. The annular poppet 242 can be moveable between a first poppet position (FIG. 3) where the annular poppet 242 can be forced against the annular poppet seat 248 by the elastic element 246, and a second poppet position where the annular poppet 242 is forced away from the annular poppet seat 248 by fluid pressure in the fluid path 232. In the first poppet position, the annular poppet 242 seals against the annular poppet seat 248 thereby inhibiting fluid flow along the fluid path 232 and into the check valve chamber 244 which leads into the outlet passage 210. The annular poppet 242 can define a poppet approach area $A_p$ on which pressure in the fluid path 232 can act on to bias the annular poppet 242 towards the second poppet position. The poppet approach area $A_p$ can be defined, in part, by an annular poppet surface 250 of the annular poppet 242.

When the pressure in the fluid path 232 acting on the poppet approach area $A_p$ exceeds a predefined level, defined by the elastic element 246 and the pressurized area of the annular poppet 242, the annular poppet 242 can move towards the second poppet position where it disengages from the annular poppet seat 248 thereby enabling fluid flow through the fluid path 232 and past the check valve 234 to the outlet passage 210. At that time, engine oil may flow from the workport 212 through the fluid path 232 into the check valve chamber 244 and onward into the outlet passage 210. In some installations, the outlet passage 210 is coupled to a fluid tank 252, such as the engine oil pan.

For pressure in the fluid path 232 to be great enough to overcome the force exerted by the elastic element 246 and the pressurized area of the annular poppet 242 and open the check valve 234, the valve element 222 can be in the first element position where the fluid path 232 can be open to allow fluid to enter from the workport 212 and act on the approach area $A_p$. In the illustrated embodiment, the lifter pressure from the engine cylinder valve lifter assembly 240 can be communicated through the workport 212 and the fluid path 232 to apply a hydraulic force on the approach area $A_p$ of the annular poppet 242, tending to lift the annular poppet 242 away from the poppet seat 248, and open the check valve 234 and provide a fluid path to the outlet passage 210. In this way, the check valve 234 can limit the pressure in the fluid path 232 (i.e., the lifter pressure exposed to the engine cylinder valve lifter assembly 240) to the pressure set by the elastic element 246 and the pressurized area of the annular poppet 242.

Figure 4:
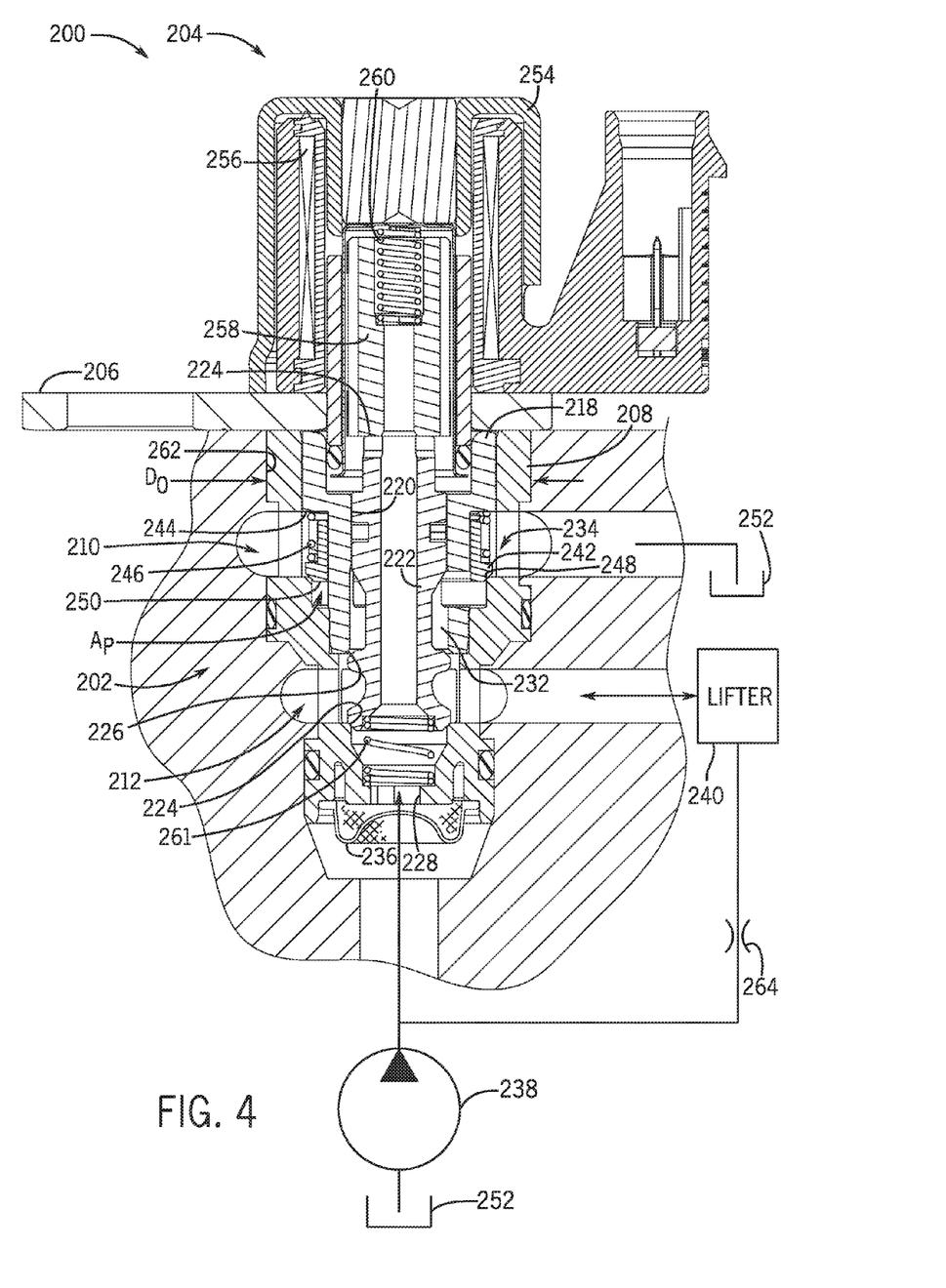
FIG. 4 shows a cross-sectional view of the control valve of FIG. 2 taken along line 4-4 with an outlet fluid path closed.
Figure 5:
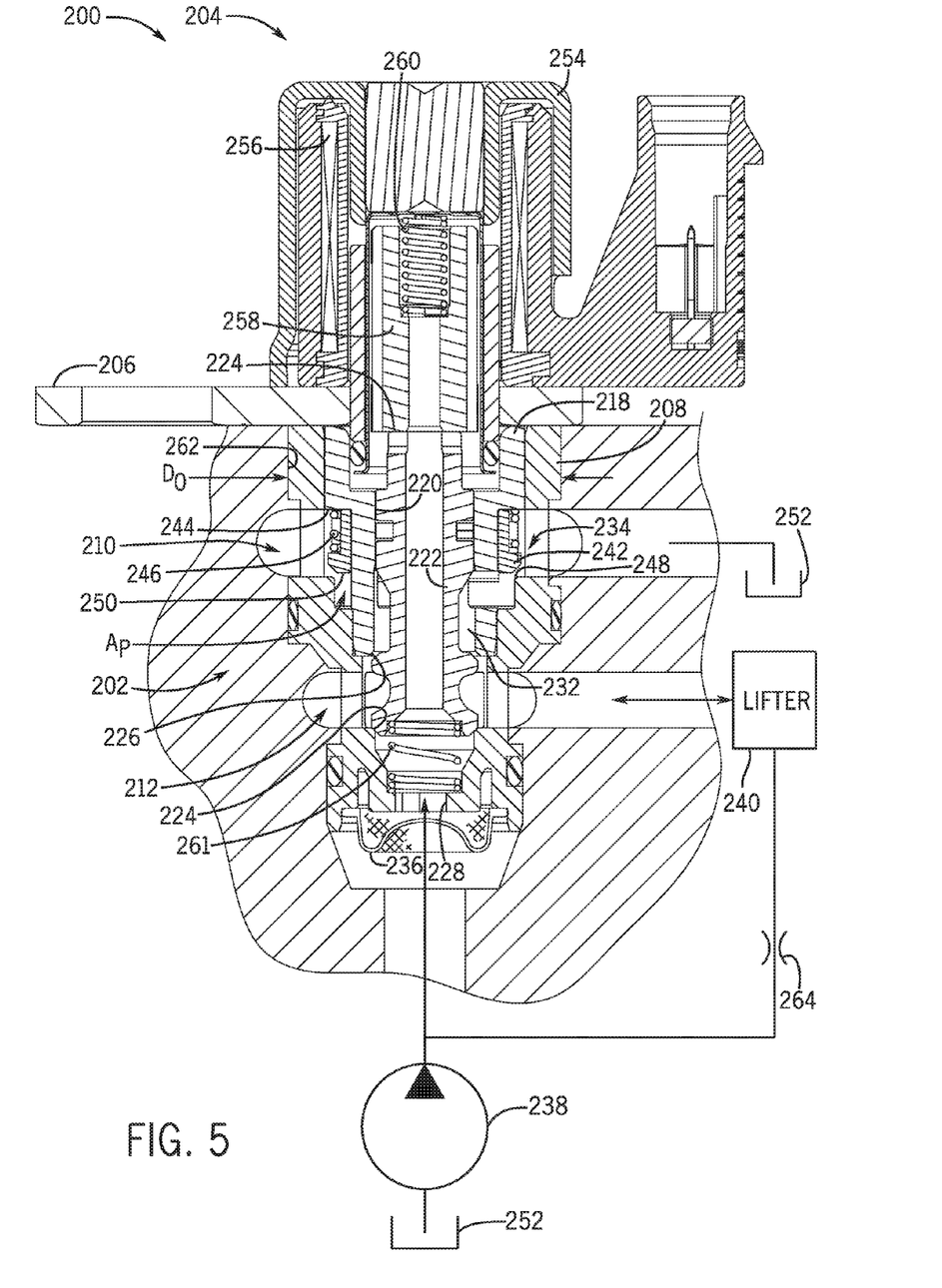
FIG. 5 shows the cross-section view of FIG. 4 with an outlet fluid path open.

Referring now to FIGS. 4 and 5, the actuator 204 of the control valve 200 can include a housing 254 coupled to the mounting flange 206. The actuator 204 can also include a solenoid 256 arranged within the housing 254 and an armature 258 arranged within the solenoid 256. A solenoid spring 260 can bias the armature 258 into engagement with the valve element 222. The force provided by the solenoid spring 260 that can bias the valve element 222 towards the first element position can be greater than a force provided by a valve element spring 261 that can bias the valve element 222 towards the second element position. Thus, when the solenoid 256 is deactivated, the valve element 222 can be biased into the first element position by the solenoid spring 260.

The actuator 204 can control the movement of the valve element 222 between the first element position and the second element position within the bore 220 of the inner body 218. As described above, when a control current is not applied to the solenoid 256 (i.e., the solenoid 256 is deactivated), the fluid path 232 can open to workport 212 (i.e., the valve element 222 can be in the first element position) allowing the fluid to flow from the cylinder valve lifter assembly 240 via the workport 212 to the annular poppet 242 of the check valve 234. When a control current is applied to the solenoid 256, the armature 258 can move "up" against the solenoid spring 260 to allow the valve element 222 to move to the second element position where fluid communication between inlet passage 228 and workport 212 can be provided and fluid communication can be inhibited along the fluid path 232 between workport 212 and the check valve 234.

In operation, the control valve 200 can be mounted within an engine cavity 262 of, for example, an engine, and the actuator 204 of the control valve 200 can be in communication with, for example, an engine control unit (ECU). The ECU can be configured to selectively activate and deactivate (i.e., selectively apply a control current) to the solenoid 256 to move the valve element 222 between the first element position and the second element position. When the solenoid 256 is activated, the valve element 222 can be moved into the second element position where the engine oil pump 238 can supply fluid to the inlet passage 228 and thereby to the engine cylinder valve lifter assembly 240 via the workport 212. When the solenoid 256 is deactivated, the valve element 222 can be biased into the first element position by the solenoid spring 260 where fluid communication can be inhibited between the inlet passage 228 and the workport 212. The engine oil pump 238 can still provid fluid to the engine cylinder valve lifter assembly 240 via an orifice 264 positioned remotely from the control valve 200 and arranged between the engine cylinder valve lifter assembly 240 and the engine oil pump 238. In other embodiments, the control valve 200 may including an orifice arranged within the control valve body 202 to provide fluid to the engine cylinder valve lifter assembly 240.

While the valve element 222 is in the second element position, fluid can flow from the engine cylinder valve lifter assembly 240 along the fluid path 232 to the approach area $A_p$ of the check valve 234. As described above, when the pressure in the fluid path 232 exceeds the force exerted by the elastic element 246 and the pressurized area of the annular poppet 242, the annular poppet 242 can be moved from the first poppet position (FIG. 4) towards the second poppet position (FIG. 5) thereby opening the check valve 234. In this way, the check valve 234 acts to regulate the pressure in the fluid path 232 to at least a pressure defined by the force of the elastic element 246 and the pressurized area of the annular poppet 242. Thus, during operation, the control valve 200 can ensure that the engine cylinder valve lifter assembly 240 always receives positive fluid pressure either from the engine oil pump 238 or the regulation provided by the check valve 234.

Exemplary advantages of the above-described control valve 200 or other control valves designed or created using the above-described techniques or properties, will be discussed below with reference to FIGS. 3-5. By no means is the following an exhaustive list of the numerous advantages provided by the invention, as will be understood by one of skill in the art.

The annular shape defined by the annular poppet 242 of the check valve 234 can provide a larger diameter, for example when compared to the ball seats 112 of the prior art control valve 102 of FIG. 1 and, thus, the check valve 234 can open a much larger flow area (when the annular poppet 242 moves towards the second poppet position) between the workport 212 and the outlet passage 210. This larger flow area can provide a reduced pressure drop through the check valve 234 allowing more flow through the check valve 234 and, in the application of cylinder valve deactivation, faster lifter pin movement (i.e., fluid can more efficiently flow from the engine cylinder valve lifter assembly 240 to the fluid tank 252 with a reduced pressure drop through the check valve 234). Additionally, the reduced pressure drop provided by the larger flow area of the annular poppet 242 can enable the check valve 234 to more consistently regulate the pressure in the fluid path 232 (when the valve element 222 is in the first element position) over a large range of fluid flowrates which can occur with changes in oil pressure and temperature. Further, the larger diameter provided by the annular poppet 242 can simplify the manufacture of the elastic element 246 because of the higher forces, for example when compared with the check valve springs 108 of the prior art control valve 102 of FIG. 1, needed to counter the larger poppet area.

The annular poppet 242 of the check valve 234 can also reduce packaging size of the control valve 200, when compared to the control valve 102. That is, the annular poppet design implemented in the control valve 200 can reduce a diameter of the cavity 262 in which the control valve 200 can be mounted. Further, in comparison to the prior control valve 102 with the balls 106, the assembly of the control valve 200 may be simplified with the elastic element 246 and the annular poppet 242 being placed over the inner body 218 and captured by the outer body 208.

The larger flow area and reduced packaging size provided by the control valve 200 can be achieved by proper geometric design (i.e., the use of the annular poppet 242). These advantages can be governed by a geometric relationship between the poppet approach area $A_p$ and the outer body diameter $D_o$. In one embodiment, the control valve 200 can define a ratio of the approach area $A_p$ to the outer body diameter $D_o$ that is between about 1.5 and about 3.5. In another embodiment, the control valve 200 can define a ratio of the approach area $A_p$ to the outer body diameter $D_o$ that is between about 2 and about 3.

While the invention may be susceptible to various modifications and alternative forms, specific embodiments have been shown by way of example in the drawings and have been described in detail herein. However, it should be understood that the invention is not intended to be limited to the particular forms disclosed. For example, the control valve body 202 may include more passages and/or fluid paths than the passages and fluid paths 210, 212, 228, and 232. Also, the control valve 200 may be used in any applicable circumstance for obtaining the desired result of allowing or inhibiting fluid flow from one device to another.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein.

What is claimed is:

1. A control valve comprising:
    a control valve body having an inlet passage, an outlet passage, a workport, and a chamber arranged in a fluid path between the workport and the outlet passage;
    an annular poppet slidably received within the chamber and to selectively engage a poppet seat to inhibit fluid flow through the fluid path when a pressure in the fluid path is less than a predefined pressure level;
    a valve element slidably received within the control valve body to selectively provide fluid communication between the inlet passage and the workport and selectively provide fluid communication between the workport and the outlet passage along the fluid path; and
    an elastic element biasing the annular poppet toward the poppet seat.

2. The control valve of claim 1, wherein the control valve body comprises an outer body extending around an inner body with the chamber formed there between.

3. The control valve of claim 2, wherein the annular poppet extends around the inner body.

4. The control valve of claim 2, wherein the annular poppet defines a poppet approach area on which the pressure in the fluid path acts upon.

5. The control valve of claim 4, wherein a force provided by the elastic element on the annular poppet and the approach area determine the predefined pressure level.

6. The control valve of claim 4, wherein the outer body defines an outer body diameter and a ratio of the approach area to the outer body diameter is between about 1.5 and about 3.5.

7. The control valve of claim 4, wherein the outer body defines an outer body diameter and a ratio of the approach area to the outer body diameter is between about 2 and about 3.

8. The control valve of claim 1, wherein the control valve body comprises a first valve seat between the inlet passage and the workport and a second valve seat between the workport and the outlet passage; and
the valve element is moveable between a first element position where the valve element engages the first valve seat and a second element position where the valve element engages the second valve seat.

9. The control valve of claim 8, further comprising at least one spring to bias the valve element toward one of the first element position and the second element position.

10. The control valve of claim 8, further comprising an actuator to actuate the valve element between the first element position and the second element position.

11. The control valve of claim 1, further comprising an actuator to move the valve element between a first element position and a second element position.

12. The control valve of claim 1, wherein the elastic element is a coil spring.

13. The control valve of claim 1, wherein the control valve is installed on an engine to operate a cylinder valve lifter assembly.

14. The control valve of claim 13, wherein the inlet passage is connected to receive fluid from an oil pump on the engine and the outlet passage is connected to an oil reservoir on the engine.

15. The control valve of claim 13, wherein the workport is connected to an engine cylinder valve lifter assembly.

16. A control valve comprising:
a control valve body having an inlet passage, an outlet passage, a workport, a first valve seat between the inlet passage and the workport, and a second valve seat in a fluid path between the workport and the outlet passage;
a valve element moveable between a first element position where the valve element engages the first valve seat and disengages the second valve seat, and a second element position where the valve element disengages the first valve seat and engages the second valve seat;
an annular poppet moveable between a first position where the annular poppet engages an annular poppet seat to inhibit fluid flow through the fluid path and a second poppet position where the annular poppet disengages the annular poppet seat and fluid flow is provided through the fluid path, wherein the annular poppet is moveable from the first poppet position towards the second poppet position when pressure in the fluid path is greater than a predefined pressure level; and
a spring to bias the annular poppet toward the first poppet position.

17. The control valve of claim 16, wherein the control valve body comprises an annular chamber in the fluid path between the second valve seat and the outlet passage, wherein the annular poppet is slidably received within the annular chamber.

18. The control valve of claim 17, wherein the control valve body comprises an outer body into which an inner body is received, the annular chamber and the annular poppet each extend around the inner body.

19. The control valve of claim 18, wherein the inner body defines a bore in which the valve element is slidably received.

20. The control valve of claim 18, wherein the annular poppet defines a poppet approach area on which the pressure in the fluid path acts upon.

21. The control valve of claim 20, wherein a force provided by the elastic element on the annular puppet and the approach area determine the predefined pressure level.

22. The control valve of claim 20, wherein the outer body defines an outer body diameter and a ratio of the approach area to the outer body diameter is between about 1.5 and about 3.5.

23. The control valve of claim 20, wherein the outer body defines an outer body diameter and a ratio of the approach area to the outer body diameter is between about 2 and about 3.

24. The control valve of claim 16, further comprising a valve spring to bias the valve element toward one of the first element position and the second element position.

25. The control valve of claim 16, further comprising a actuator to move the valve element between the first element position and the second element position.

* * * * *